US009292324B2

(12) United States Patent
Rasmusson

(10) Patent No.: US 9,292,324 B2
(45) Date of Patent: Mar. 22, 2016

(54) VIRTUAL MACHINE SUPERVISION BY MACHINE CODE REWRITING TO INJECT POLICY RULE

(75) Inventor: Lars Rasmusson, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 265 days.

(21) Appl. No.: 13/981,646

(22) PCT Filed: Feb. 18, 2011

(86) PCT No.: PCT/SE2011/050183
§ 371 (c)(1),
(2), (4) Date: Jul. 25, 2013

(87) PCT Pub. No.: WO2012/112095
PCT Pub. Date: Aug. 23, 2012

(65) Prior Publication Data
US 2013/0346977 A1 Dec. 26, 2013

(51) Int. Cl.
*G06F 9/455* (2006.01)
(52) U.S. Cl.
CPC ........ *G06F 9/45533* (2013.01); *G06F 9/45541* (2013.01); *G06F 9/45558* (2013.01); *G06F 2009/45591* (2013.01)
(58) Field of Classification Search
None
See application file for complete search history.

(56) References Cited

U.S. PATENT DOCUMENTS

| | | | | |
|---|---|---|---|---|
| 7,350,204 B2 * | 3/2008 | Lambert et al. | ............... | 717/172 |
| 7,856,653 B2 * | 12/2010 | Berger et al. | ..................... | 726/1 |
| 8,234,640 B1 * | 7/2012 | Fitzgerald et al. | ................. | 718/1 |
| 8,234,641 B2 * | 7/2012 | Fitzgerald et al. | ................. | 718/1 |
| 8,627,490 B2 * | 1/2014 | Lim | ................................ | 726/27 |
| 8,875,266 B2 * | 10/2014 | Chambers et al. | ................. | 726/7 |
| 8,949,825 B1 * | 2/2015 | Fitzgerald et al. | ................. | 718/1 |
| 9,015,703 B2 * | 4/2015 | Fitzgerald et al. | ................. | 718/1 |
| 2006/0021029 A1 | 1/2006 | Brickell et al. | | |
| 2006/0143143 A1 * | 6/2006 | Chan et al. | ..................... | 706/47 |
| 2009/0125974 A1 | 5/2009 | Zhang et al. | | |
| 2009/0222880 A1 | 9/2009 | Mayer et al. | | |
| 2009/0328225 A1 | 12/2009 | Chambers et al. | | |
| 2011/0047542 A1 | 2/2011 | Dang et al. | | |

OTHER PUBLICATIONS

C. Luk, et al.: "Pin: Building Customized Program Analysis Tools with Dynamic Instrumentation" PLDI'05 Proceedings of the 2005 ACM SIGPLAN conference on Programming language design and implementation; Jun. 12-15, 2005; http://rogue.colorado.edu/Pin; pp. 190-200.

B. Payne, et al.: "Secure and Flexible Monitoring of Virtual Machines" Twenty-Third Annual Computer Security Applications Conference, Dec. 10-14, 2007. ACSAC 2007; pp. 385-397.

(Continued)

*Primary Examiner* — Van Nguyen
(74) *Attorney, Agent, or Firm* — Patent Portfolio Builders, PLLC

(57) ABSTRACT

An arrangement in a virtual machine for virtual machine supervision is provided. The arrangement comprises a translator operable in the virtual machine. The translator comprises a receiving unit adapted to receive program code to be executed on the virtual machine and a rule referring to the execution of the program code. The arrangement further comprises a code unit adapted to create rule infused machine code based on the program code and the rule, such that the rule is enforced when the machine code is executed on the virtual machine.

10 Claims, 4 Drawing Sheets

(56) References Cited

OTHER PUBLICATIONS

Bruening, Derek L. (2004) "Efficient, Transparent, and Comprehensive Runtime Code Manipulation" (Doctoral Dissertation). Retrieved from DSpace@MIT Order No. AAI0807735, 306 pages.
V. Bala, et al.: "Dynamo: A Transparent Dynamic Optimization System" PLDI'00 Proceedings of the ACM SIGPLAN 2000 conference on Programming language design and implementation, pp. 1-12.
International Search Report, PCT/SE2011/050183, Nov. 10, 2011.
Written Opinion of the International Searching Authority, PCT PCT/SE2011/050183, Nov. 10, 2011.
Written Opinion of the International Preliminary Examining Authority, PCT PCT/SE2011/050183, Feb. 1, 2013.
International Preliminary Report on Patentability, PCT/SE2011/050183, Jun. 12, 2013.

* cited by examiner

VIRTUAL MACHINE SUPERVISION BY MACHINE CODE REWRITING TO INJECT POLICY RULE

CROSS REFERENCE TO RELATED APPLICATION

This application is a 35 U.S.C. §371 national stage application of PCT International Application No. PCT/SE2011/050183, filed on 18 Feb. 2011, the disclosure and content of which is incorporated by reference herein in its entirety. The above-referenced PCT International Application was published in the English language as International Publication No. WO 2012/112095 A1 on 23 Aug. 2012.

TECHNICAL FIELD

The invention relates generally to a method and arrangement for virtual machine supervision.

BACKGROUND

The past years there has been a strong move in the field of computing services towards usage of virtualization technologies. Virtualization allows the running of unmodified legacy applications on hardware platforms. This is realized through on-the-fly translation from one hardware instruction set to another with the assistance of a so-called hypervisor or Virtual Machine Monitor (VMM). A VMM runs in the most privileged mode in a system running a virtual machine and has full control over vital system resources. A VMM-based system not only allows instruction translation, but increased system utilization as multiple Virtual Machines (VMs) can run simultaneously on a single powerful hardware platform, opening for different business models and a business landscapes. This implies, for example, that existing services can rather easily be migrated into large computing clusters, often referred to as "the cloud".

One drawback of this new flexibility is that it creates increased security risks. Systems which previously were physically isolated from each other, might rn on the same machine which may entail unwanted interaction between VMs running simultaneously on the same hardware.

Furthermore, when virtualized solutions are run on a service provider platform to service clients, an information gap is created since the clients does not have full insight in the execution of the VM, at the same time as the service provider does not have full insight in the applications running on the VMs. In reality, this is even more complex, since the application running on the VM can be owned by a third party and licensed to a client for a particular use.

When clients upload arbitrary code to a service provider's computer there is a considerable risk that clients upload code that by mistake malfunctions. Other risks include that the code or the clients' computers may have been compromised by hackers, rogue employees or competitors of the client etc. From the view of the service provider it is therefore of utmost importance that software which cannot fully be trusted to not damage the system is either prohibited from executing on the platform or supervised.

Virtual Machines typically use CPU support to isolate the effects of the clients' code to be inside limits. Typically, a CPU has multiple execution privilege levels, and higher privilege levels can configure the CPU to disallow lower privilege levels from executing certain instructions or accessing certain parts of the computer. This can be used to prevent a VM running in a low privilege level to access hardware.

However, some CPUs have insufficient hardware support for virtualization. To isolate a virtual machine on such a CPU, the VMM will have to scan through the VMs code and replace insufficiently handled functions with other instructions that transfer control back to the trusted and more privileged code base.

The hardware support provides the ability to trap individual memory accesses, and the execution of specific instructions, but not, for instance, on specific values in the instructions, such as when a value oversteps a certain limit, or when the sum of some values oversteps a limit. To enforce such a limit, every instruction that may modify either of the values involved must be trapped. Eventually, for increasingly complex limits, the bluntness of the built-in trigger conditions will lead to the need to trap almost every instruction. Trapping every instruction, or a large subset of all the instructions, is very costly, in particular on modern CPU architectures that rely heavily on code to execute in predictable straight segments. Without the ability to take advantage of pipelining, branch prediction, modern cache prediction and eviction schemes, each instruction can be slowed down in the order of 1000 times if it has to work against the design of the hardware. A consequence is that current hardware can only enforce rules that trigger on simple conditions, such as when the CPU accesses a particular memory area.

A complex rule, as opposed to a simple rule, depends on several things to occur or having occurred. For instance, one may want to enforce the rule of a software license that only permit a certain limited number of users, e.g. identified by entries in a list Such a rule may depend on the values in a data structure spanning multiple areas of the memory. To enforce a complex rule using state of the art methods, a VMM may have to investigate all instructions that modify the relevant memory locations. With only simple conditions available, the CPU will have to place simple and independent triggers on each of the memory locations in question, and the CPU will trigger exceptions on many occasions, when the complex rule is still only partially fulfilled.

SUMMARY

It is an object of the embodiments herein to address at least some of the problems and shortcomings outlined above by using a method and an arrangement as defined in the attached independent claims.

According to one aspect, an arrangement in a virtual machine for virtual machine (VM) supervision is provided. The arrangement comprises a translator operable in the virtual machine. The translator in turn comprises a receiving unit, adapted to receive program code to be executed on the VM, and a rule referring to the execution of the program code. The translator further comprises a code unit adapted to create rule infused machine code based on the program code and the rule, such that the rule is enforced when the machine code is executed on the VM.

According to another aspect, a method in a virtual machine of supervising an execution of program code in the virtual machine if further provided. The method comprises the steps of receiving program code to be executed on the virtual machine, receiving a rule, and creating rule infused machine code based on the program code and the rule, such that the rule is enforced when the machine code is executed on the virtual machine.

By the provided arrangement and method, complex checks can be defined in software and checks that involve higher level objects, such as properties of data structures can be used.

The above method and arrangement may be configured and implemented according to different optional embodiments. According to one embodiment, the receiving unit is adapted to receive the rule from a policy provider external to the virtual machine, such as a service provider hosting the hardware, a client operating the VM or a license provider.

According to one embodiment an executing unit is adapted to execute the rule infused machine code, and check if the execution of the rule infused machine code complies with the rule. The executing unit may further be adapted to, based on the check, perform at least one of increase/decrease a counter, assign a value to a memory cell, create a log entry, change resources available to the virtual machine, send a signal to the external policy provider, execute a subroutine that virtualizes a hardware, and execute a subroutine named in or provided in the rule.

According to one embodiment, the arrangement further comprises a private memory area in which the executing unit is adapted to, based on the check, store a value such that the value can be accessed during a later check such that an action can be performed based on the value. Me private memory area is private such that only rule elements in the rule infused machine code can access values in the private memory area.

According to one embodiment, the arrangement further comprises a policy unit adapted to receive a policy file from the policy provider, create the rule based on the received policy file, and send the rule to the receiving unit of the translator.

According to one embodiment, the arrangement further comprises a verification unit adapted to verify that the policy provider is a trusted policy provider.

According to one embodiment, the receiving unit is further adapted to receive a new rule and the code unit is further adapted to create a new rule infused machine code based on the program code and the new rule and replace the rule infused machine code with the new rule infused machine code. This way the policy may be updated when the virtual machine is running.

Further possible features and benefits of this solution will become apparent from the detailed description below.

BRIEF DESCRIPTION OF DRAWINGS

Some possible embodiments will now be described, by way of example, with reference to the accompanying drawings, in which.

DETAILED DESCRIPTION

Figure 1:
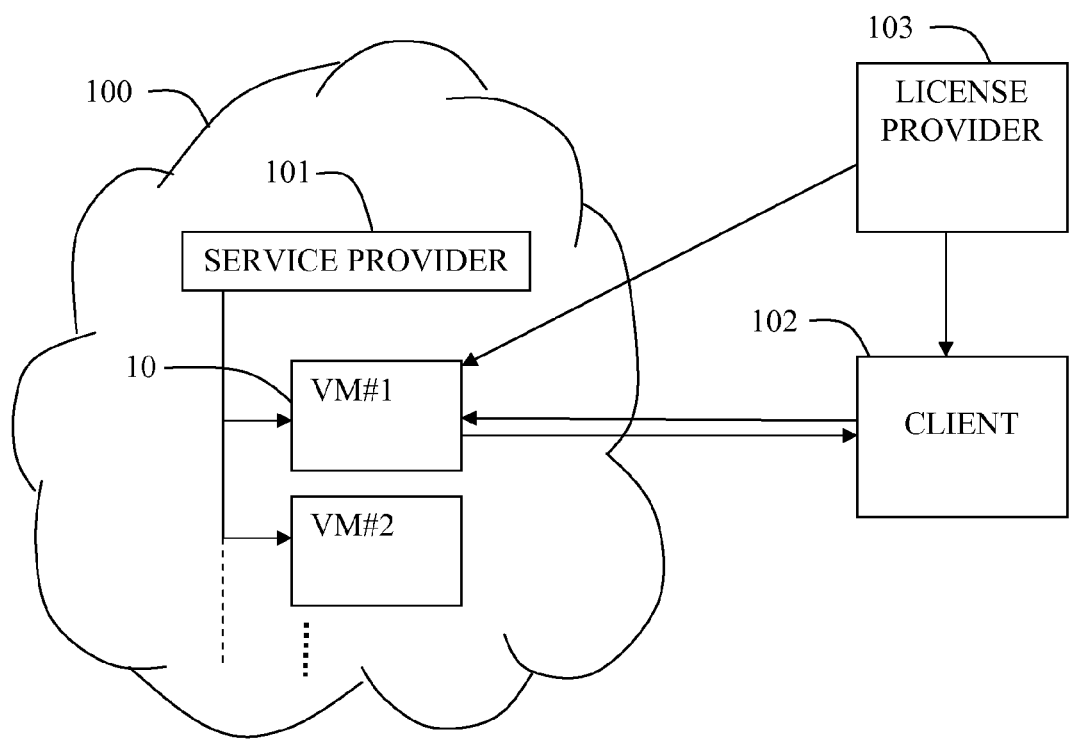
FIG. 1 is an overview of an arrangement for virtual machine supervision.

An arrangement and method for supervision of a virtual machine are provided to enable the enforcement of a policy by injecting a set of rules for the execution of program code into the program code, i.e. creating "rule infused machine code" based on the program code and rules derived from the policy. The rules refer to the execution of the program code and are based on the policy. The rules could be simple rules, each relating to single parameters, or complex rules each relating to several parameters in the system. The policy could for example come from a service provider hosting the Virtual Machine (VM), from a client that wishes to launch the VM, or from a license provider owning the rights to the applications and seeking control of the execution of the licensed software.

Since the rules are inserted into a code without changing the basic structure of the code, even complex rules can be optimized and pipelined for streamlined execution such that the policy can be enforced with a limited or no effect on the performance of the system.

The rule elements of the code could operate in a private memory area and the execution of the program code can thus be supervised without the client and/or service provider (e.g. depending on who has provided the policy) seeing the supervision in the execution of the original program code. The method increases trust in the execution since all involved parties could include rules related to specifics of the execution which is of importance to that particular party. As a result, the service provider may ensure that no security critical instructions are performed on the platform; the client may ensure that the service provider does not modify the program code, and the license provider may ensure that the terms of the license are not breached.

In the following a more detailed description of some exemplifying embodiments will be given. In the figures, like reference numerals are used to designate identical or corresponding elements throughout the figures. Units in the figures made up of dotted lines may be considered as optional in relation to the basic concept of this solution.

FIG. 1 shows an overview of an embodiment of the arrangement in which the VM 10 runs in a service provider network 100, sometimes referred to as a "cloud". The policy to be implemented on the virtual machine may come from the service provider 101 communicating with the Virtual Machine (VM) platforms 10 and be drafted to ensure that the requirements of the service provider are fulfilled in the execution of code received from a client 102. Alternatively, the policy is provided by the client 102 operating the virtual machine 10 and could be a policy for enforcing rules relating to what freedom the platform 10 has when executing the code. In yet another alternative, the policy is received from a license provider 103 owning the right to the applications run by the client 102 on the VM 10, and could be a policy for controlling the execution of the licensed software. It is furthermore conceivable that the policy is generated as a combination of requests from the three parties 101; 102; 103 above.

Figure 2:
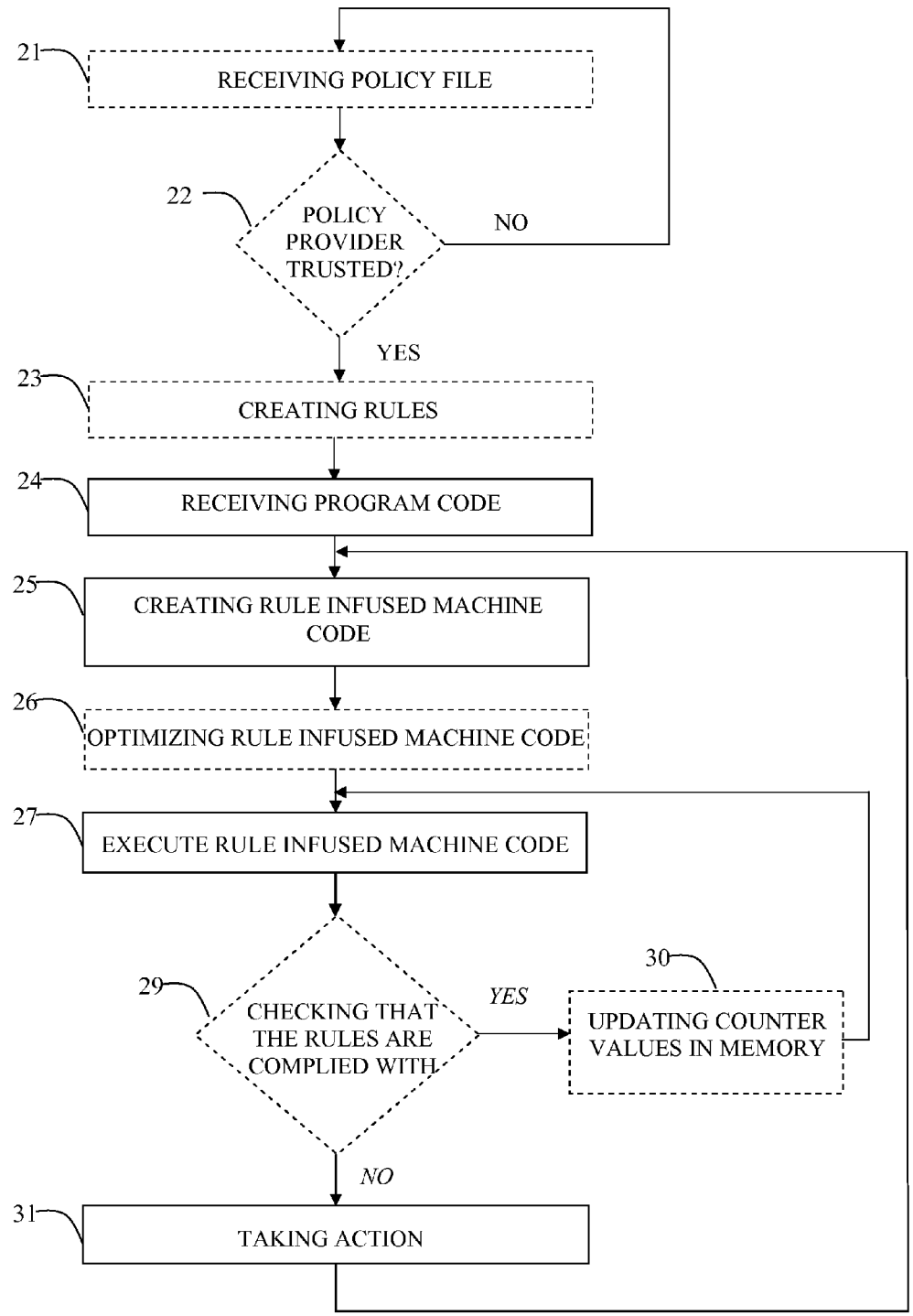
FIG. 2 is a flow chart showing a method of virtual machine supervision.

FIG. 2 is a flowchart showing a method for virtual machine supervision according to an exemplifying embodiment which may be executed by an arrangement for virtual machine supervision firstly, a policy file may be received 21 from an external policy provider, which could be a client that wishes to launch the virtual machine, a service provider that is hosting the virtual machine on its physical hardware or a license provider that allows a client to run licensed software. The step of receiving 21 the policy file is to be seen as optional since in some embodiments, the policy file can be generated in advance and stored in a translator, which will be described with reference to FIG. 3. The method could further comprise a verification step 22 in which a provider of the policy file is verified as a trusted policy provider, for example by the policy provider signing the policy file with a certificate that may be verified. If the policy provider cannot be verified as trusted, the policy file should be rejected.

The policy file typically lists a set of rules and measurements that should be enforced on the virtual machine. In some instances, the rules includes counters of how many times certain events have occurred or co-occurred and actions that should be taken when the counted events occurred a preset number of times or with a preset frequency. The actions could for example be to abort the VM, report the status back to the policy manager, slow down the VM, and/or enable/disable other actions. The policy could be a security policy, monitoring the areas of the VM accessed by the code running on the virtual machine and could as such be a useful element for access restriction of an executing code.

After the step of verifying the policy provider rules 23 are created in the form of code elements based on the policy file. The created rules define what the rules control and how the rules should be implemented. The rules may be in a declarative form, describing what should be monitored, or in an imperative form describing what operations or memory areas that should be monitored.

The method further comprises the step of receiving program code 24 which is the code to be executed on the VM, such as code related to the operating system and/or applications running on the VM. The program code and rules are used for creating 25 rule infused machine code based on the program code and the rules.

The rule infused machine code created in the preceding step 25 may be created as an intermediate code representation, not necessarily being in the native machine code format required for running on the hardware platform. In step 26, the code may be optimized by means of for example function inlining, dead code removal and/or constant folding. For example may a Just In Time (JIT) compilation framework be used to produce native machine code from the optimized rule infused machine code such that the native machine code can be executed on the platform.

The native machine code infused with rules based on the policy file is then executed 27 on the virtual machine such that when a rule element is executed it is checked 29 whether that the rule of the rule element is complied with. Since the rules are an integral part of the native machine code and describe how to locate interesting memory locations and/or what action that should be taken, the rules can involve higher level objects, such as properties of data structures, without leading to the trapping of very large amounts of instructions. A particular rule instruction may include the final action to be taken, in which case the step of taking action 31 is executed if the rule is not complied with. If the rule is complied with, a counter value may be updated 30 in the memory, e.g. for keeping track of the number of times a check 29 or an element of the program code has been executed, whereafter the execution 27 of the rule infused machine code resumes until a new rule appears. The process of checking and/or updating 30 the values for making sure that the policy is complied with 29 may be repeated until a counter value is on, above or below a preset value i.e. fulfilling a preset requirement for taking action 31. The step of taking action 31 could for example comprise: creating a log entry (logging that a rule has been compromised), changing resources available to the virtual machine, sending a signal to the external policy provider or executing a subroutine named in or provided in the policy. The subroutine may be a subroutine that virtualizes a hardware, such as a device mapped in the memory, such that the device may be virtualized directly using the rule elements in the rule infused machine code, thus not requiring a processor interrupt.

When the policy provider provides a new policy the process is restarted, the cache containing the old rule infused machine code is flushed and new rule infused machine code based on the new policy is created 25 and executed according to the scheme previously described. This process enables the updating of the policy dynamically without affecting the execution of the program code.

An example of a scenario when the supervision of a virtual machine could be required is that a company X delivers software (program code) to another company Y. The program code runs on Y's computers. X licenses the program code to Y based on usage. X wants to prevent from configuring the program code to give more service than was actually licensed. At the same time Y needs to be able to have access to the Operating System (OS) and configure the program code locally. X wants to enforce the limits on the software that Y is running in such a way that the measuring/enforcement code is invisible to Y. X creates a policy file specifying the supervision and sends the policy file to the arrangement for virtual machine supervision. Rules are created 23 based on the policy file and are used together with the program code to create rule infused machine code 25 to be executed on the VM. This way, X can include rules related to the execution of the program code, after it has been configured by Y, which can include complex checks on the execution which Y cannot modify, and which remain invisible to Y.

Figure 3:
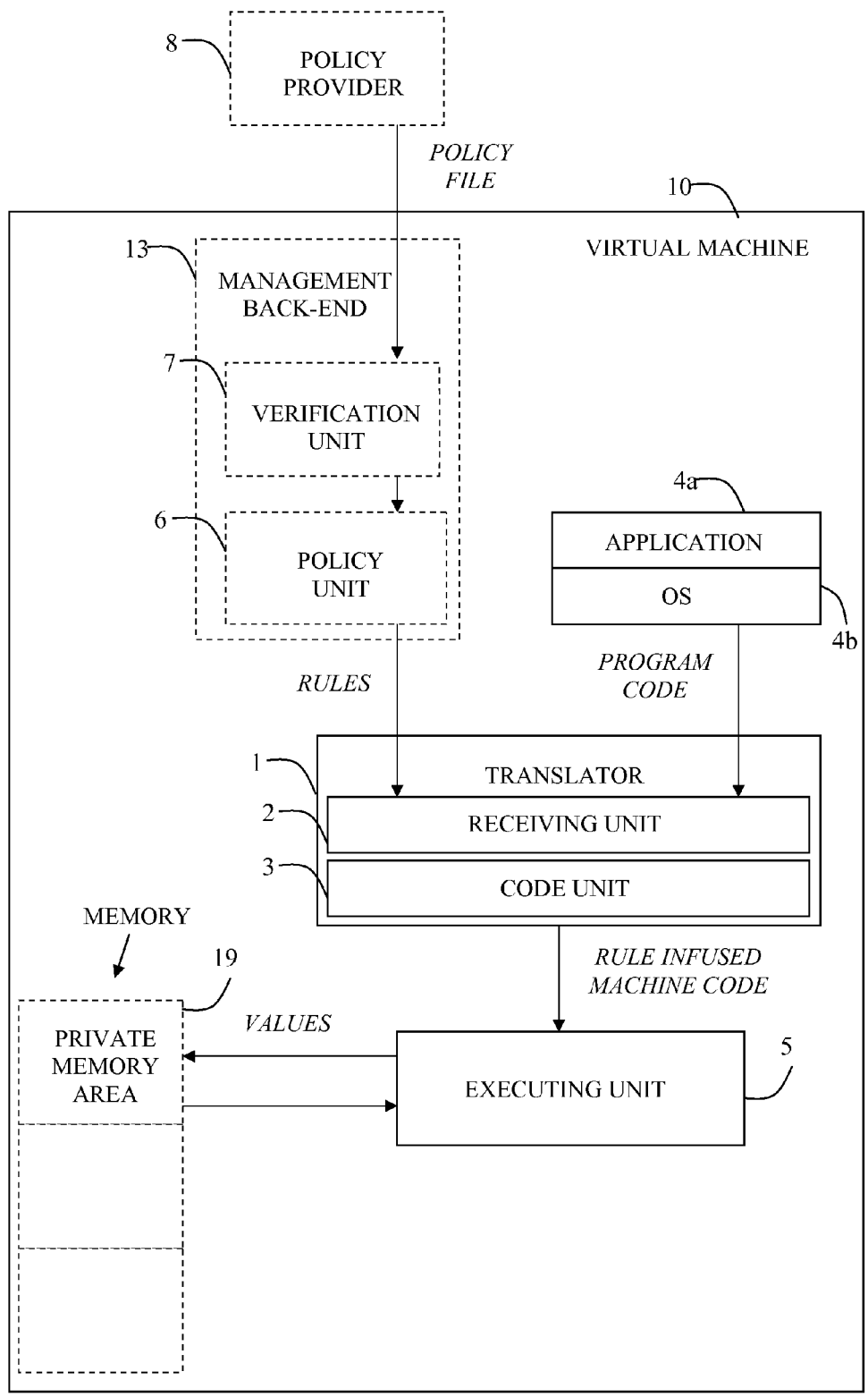
FIG. 3 is a block diagram showing, schematically, an arrangement in a virtual machine implementing a method of virtual machine supervision.

FIG. 3 is an exemplifying embodiment of an arrangement in a virtual machine 10 in which the method described with reference to FIG. 2 could be implemented. The arrangement comprises a translator 1 which in turn comprises a receiving unit 2 and code unit 3. The receiving unit 2 is adapted to receive program code to be executed on the virtual machine and rules referring to the execution of the program code. The code unit 3 connected to the receiving unit is adapted to create rule infused machine code based on the program code and a rule, such that the rule is enforced when the machine code is executed on the virtual machine.

The receiving unit 2 may be adapted to receive rules based on a policy file from a policy provider 8 external to the virtual machine 10. The policy provider 8 could for example be a client that wishes to launch the VM, the service provider that is hosting the VM on its physical machine, or a license provider that allows a client to run licensed software. The involvement of a policy provider 8 should be regarded as optional since, in some embodiments, the policy file may be generated in advance and stored in the translator 1.

The arrangement further comprises a verification unit 7 in a management back-end 13 of the virtual machine 10, the management back-end being adapted to receive the policy file from a external provider 8 and verify that the provider 8 of the policy file is a trusted policy provider. The verification step could be performed by the policy provider 8 signing the policy file with a certificate that the verification unit 7 can verify. If the sender can't be verified as a trusted sender, the policy file is rejected.

The management back-end 13 further comprises a policy unit 6 adapted to create the rules based on the policy file. After creation, the policy unit 6 sends the rules to the receiving unit 2 of the translator 1.

The receiving unit 2 of the translator 1 is further adapted to receive program code to be executed, the program code being related to a guest OS or applications running on the VM. The receiving unit 2 further receives the rules created by the policy unit 6 and transfers both the program code and the rules to the code creator 3 which creates rule infused machine code based on the program code and the rules.

The rule infused machine code, now comprising the rules in form of rule elements in the machine code, is sent to an executing unit 5 in the arrangement adapted to receive the rule infused machine code. The executing unit comprises the VMM that compiles the rule infused machine code, for example using a JIT translation scheme, to native machine code adapted for the hardware platform on which the virtual machine is implemented. Since the rules are infused in the program code they appear as normal code in the normal instruction flow and therefore do not have to trigger the hardware traps to test if a rule is complied with or not The executing units is adapted to execute the rule infused machine code including the rule elements and to check that the execution of the rule infused machine code complies with the rule. As an example, a rule for preventing an application from making a certain function call more than five times may be implemented. The translator 1 may implement the rule by injecting code to increase the counter in the beginning of the function, and to check that the counter is not more than five before the function is entered. This process may be repeated every time the function is run until the counter value is more than five, in which case an action will be taken. The step of taking action could for example comprise: creating a log entry (i.e. logging that a rule has been compromised), changing resources available to the virtual machine, sending a signal to the external policy provider, executing a subroutine named in or provided in the policy or execute a subroutine that virtualizes a hardware.

The executing unit 5 may be adapted to maintain a set of different memory regions and protect a private memory area 19 by creating machine code from the original program code that never accesses that area 14. Complex checks that require storage of intermediate results require a private memory area 19 to remain invisible in relation to the execution of the received program code. The intermediate results may involve counters and partial state flags for the tests, each stored in a register in the private memory area 19. The private memory area 19 is private in the sense that the received program code will be rewritten such that it is not able to access the memory in the private area 19 and thus the checks performed by the rule portions of the code remain invisible to the program code. In this sense, the translator 1 protects the private memory area 19 from the VM. Since the private 19 and public part of the memory are mapped in different areas of the same memory the memory can be accessed without changing the CPU's state, thus enabling rapid update of counters and flags in the private memory area 19 and the updates will disturb the CPU's cache minimally.

Figure 4:
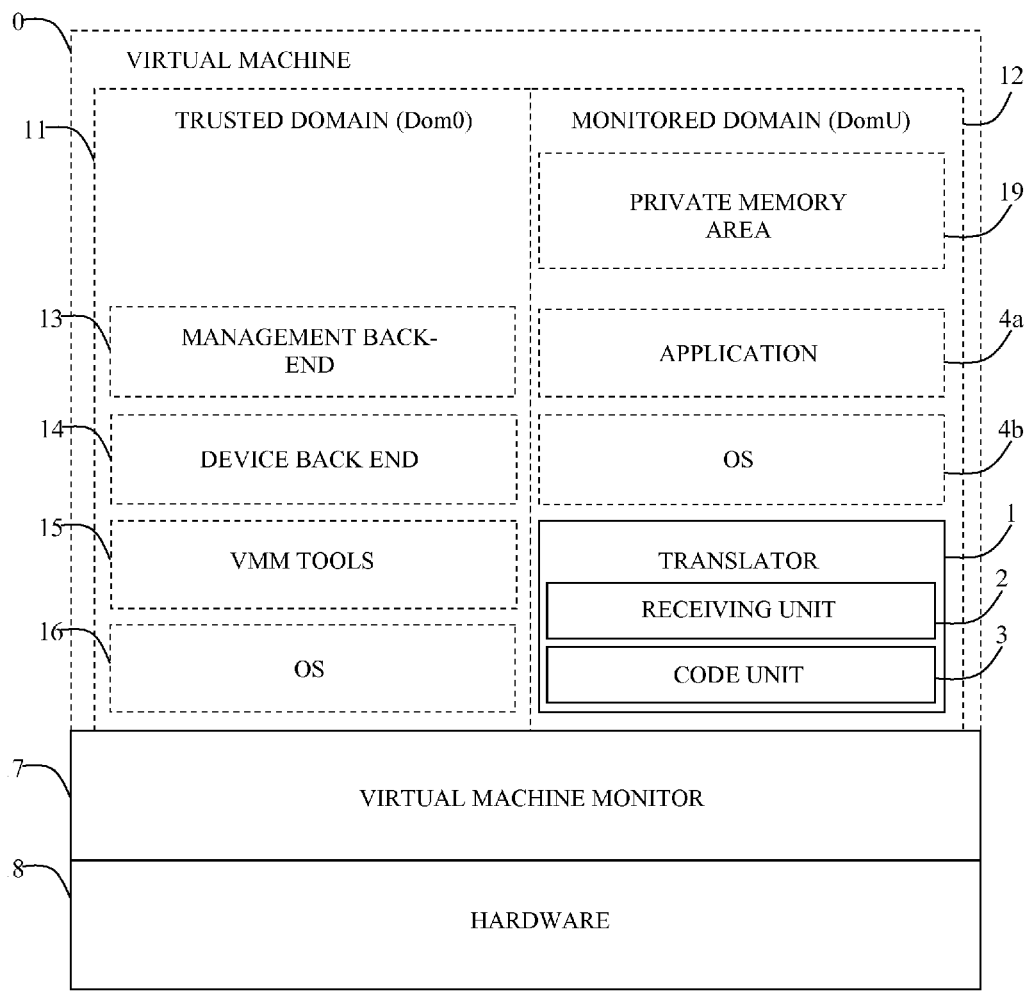
FIG. 4 is a block diagram showing an embodiment in which the method and arrangement for monitoring a virtual machine is implemented in a Xen system.

FIG. 4 shows an embodiment where the method disclosed with reference to FIG. 2 is implemented in a VM with a Xen VMM. The Xen system has a structure with the Xen VMM 17 as the lowest and most privileged layer on top of the platform hardware 18. Above the VMM layer there may be one or more guest operating systems 16; 4b operating a virtual machine domain 11; 12. In this example a first guest operating system 16 runs in what in Xen terminology is known as "domain 0" 11 which is a trusted domain that boot automatically with the VMM 17 and has special management privileges and direct access to all physical hardware 18 by default. The system administrator may log into the trusted domain 11 in order to manage any further guest operating systems 4b in domains 12 monitored by the VMM, in Xen terminology known as "domain U". Modified versions of Linux, Net BSD and Solaris may run as OS 16 in the trusted domain 11 and several modified Unix-like operating systems may function as guest operating systems 4b in the monitored domains 12 (domain U). The VMM 17 provides a communications channel between the monitored domain 12 and "device back ends" 14 in the trusted domain 11 for providing a software interface to virtual devices (network cards, disks, etc.) that the VMM 17 allows the guest OS 4b to access, the monitored domain 12 can thus only access virtual component provided by the trusted domain 11 which in turn has access to the physical components 18.

For enabling the method described with reference to FIG. 2, the trusted domain 11 comprises a management back-end 13 that can receive a policy file from a policy provider (shown as 8 in FIG. 3). The management back-end 13 verifies the policy provider's authority by requiring that the policy file is cryptographically signed by the provider, creates rules from the policy, and informs the translator 1 what new instruction to add to the program code of the OS 4b of the monitored domain 12 and applications 4a running on the OS 4b. The policy file comprises rules for the execution of the program code and rules defining how and when the policy should be updated. Policy providers use a secure communication channel for communicating with the management back-end 13, such as a computer network, a console, a memory stick, etc. with adequate authentication and encryption.

A further communication channel between the "management back end" 13 and the translator 1 is provided using the inter-VM communication tools of the VMM (in this embodiment Xen). The communication channel is used by the management back-end 13 to inform the translator 1 of which rules to install, and for collecting monitoring data. The communications channel also enables the translator to notify the management backend 13 when particular event have occurred.

The receiving unit 2 of the translator 1 receives the rules from the management backend 13 and program code related to the OS 4b and applications 4a and creates rule infused machine code in a code unit 3 which is an intermediate representation of the native machine code. The advantage with creating an intermediate representation is that the code can be optimized before finally compiled to native machine code for executing on the hardware 18. The optimization step makes many operations that would have been register-to-memory operations into register-to-register operations and thereby speeds up the execution. The optimization step in the code generating phase also enables optimization by merging several monitoring checks into a just few. Creating the code first as an intermediary representation also makes it possible to change the policy while the program is running.

The rule infused machine code now includes counters that are stored in private park of the memory 19 that the original program code is changed to never access. By changing the instruction functions, the rule code for a specific instruction is inserted at every place where a corresponding instruction is executed in the new machine code. As is commonly done, new code is cached so it does not have to be generated when it is called again. When the policy changes, the cache has to be cleared and new code must be generated such that the old code is replaced. If multiple policies are in place, separate caches could be kept for each policy to speed up the switching delay when warming up the code cache.

As previously mentioned, an example of a rule infused in the program code is a rule preventing an application from making a certain function call more than a certain amount of times. The rule will have to show the VMM how to find the function call by starting from a known address in the kernel, how to locate the address of the function, and tell the translator 1 to inject code to increase the counter in the beginning of the function, and to check that the counter is not more than a certain value before the function is entered. The infused code elements with the rules describe how to locate and monitor interesting memory locations, where for example information coupled to function calls is stored. The memory locations can be found using tools such as 'scanmem' which is a utility for linux that can locate the address of a variable in an executing process. Alternatively, interesting memory locations could be located using compilation information such as symbol tables or header files. Another function that could be used in the rules is XenAccess which is a function that allows the trusted domain to view the runtime state of the monitored domain 12. XenAccess uses a format for specifying memory locations that starts with kernel symbols (which are statically mapped), from which one can locate data structures in memory, such as the process table. The data structures are searched for relevant entries, such as process names, and are followed further into the memory of a specific process.

The translator 1 maintains a set of different memory regions for keeping the rule element separate from the execution of the program code. It protects the private memory area 19 by creating machine code from the original program code that never will access that area. It is not done via the Memory Management Unit (MMU), since the code will be intermixed with code that may access the private data area, but instead it is enforced in the instruction functions themselves, in their internal mapping between virtual and real address spaces. Since the MMU does not have to change its setting on each instruction, instructions can be efficiently pipelined, caches do not have to be flushed, and thus the code can execute fast. The rule infused machine code is mapped into the VM memory region. The program code received by the translator 1 is taken from a read only part of the memory where the guest OS 4b is mapped, and where the guest OS 4b later will map in executable code pages from programs. The program code is never executed directly, only read by the translator and used as input for creating the rule infused machine code.

Data pages allocated by the guest OS 4b and applications 4a can be mapped unchanged into the VM memory. When they are changed from read/write to executable we need to allow for jumps into that code area, and track modifications to the area to invalidate generated code. One way to do that is to invalidate all generated code for the entire page when it is first written to. Likewise, when an executable page is changed into a read/write page its associated code must be invalidated.

Advantages with the described method may include that the generated optimized code can be executed in an order better suited for modern CPU architectures with deep pipelines and complex caches since it reduces the number of interrupts and cache evictions that are necessary for the competing technology. Complex checks can be defined in software and checks that involve higher level objects, such as properties of data structures can be used, rather than myopic monitoring of individual memory cells. Since the code elements describing the rules are continuously created, the policy can be updated while the VM is running simply by invalidating the generated code in the code cache. The tests can quickly be turned on or off simply by choosing which version of the cached generated code that should be used. The rule elements of the code are not visible to the VM since the VM only has access to the original addresses in the virtualized memory and the newly generated code is located on new, different addresses.

It will be appreciated that the figures described are for illustration only and are not in any way restricting the scope of the invention. Please note that any embodiment or part of embodiment as well as any method or part of method could be combined in any way. All examples herein should be seen as part of the general description and therefore possible to combine in any way in general terms. It should be noted that the FIGS. 1-4 merely illustrate various unit in the nodes or functional unit in a logical sense, although the skilled person is free to implement these functions in practice using suitable software and hardware means.

ABBREVIATIONS

VM Virtual Machine
VMM Virtual Machine Monitor
OS Operating System

The invention claimed is:

1. An arrangement in a virtual machine for virtual machine supervision, the arrangement comprising one or more processors configured to:
   receive program code to be executed on the virtual machine, wherein the one or more processors are further configured to receive a rule from a policy provider external to the virtual machine, the rule referring to the execution of the program code,
   create rule infused machine code based on the program code and the rule, by injecting instructions that enforce a set of rules for the execution of program code into the program code, such that the rule is enforced when the machine code is executed on the virtual machine,
   execute the rule infused machine code,
   check if the execution of the rule infused machine code complies with the rule, and based on the check, store a value in a private memory area, and at a later check, access the value and perform an action based on the value, wherein the private memory area is private such that only rule elements in the rule infused machine code can access values in the private memory area.

2. The arrangement according to claim 1, wherein the one or more processors are further configured to, based on the check, perform at least one of:
   increase/decrease a counter,
   assign a value to a memory cell,
   create a log entry,
   change resources available to the virtual machine,
   send a signal to the external policy provider,
   execute a subroutine that virtualizes a hardware, and
   execute a subroutine named in or provided in the rule.

3. The arrangement according to claim 1, wherein the one or more processors are further configured to:
   receive a policy file from the policy provider,
   create the rule based on the received policy file.

4. The arrangement according to claim 3, wherein the one or more processors are further configured to verify that the policy provider is a trusted policy provider.

5. The arrangement according to claim 1, wherein:
   the one or more processors are further configured to receive a new rule, and
   the one or more processors are further configured to create a new rule infused machine code based on the program code and the new rule, and replace the rule infused machine code with the new rule infused machine code.

6. A computer implemented method in a virtual machine of supervising an execution of program code in the virtual machine, wherein the program code is stored on a non-transitory computer readable medium, the method comprising:
   receiving program code to be executed on the virtual machine,
   receiving a rule from a policy provider external to the virtual machine,
   creating rule infused machine code based on the program code and the rule, by injecting instructions that enforce a set of rules for the execution of program code into the program code, such that the rule is enforced when the machine code is executed on the virtual machine,
   executing the rule infused machine code at the virtual machine, checking that the execution of the rule infused machine code complies with the rule, and storing a value based on the check in a private memory area, and accessing the value at a later check and performing an action based on the value, wherein the private memory area is private such that only rule elements in the rule infused machine code can access values in the private memory area.

7. The method according to claim 6, further comprising, on the basis of the check, performing at least one of:

increasing/decreasing a counter,
assigning a value to a memory cell,
creating a log entry,
changing resources available to the virtual machine,
sending a signal to the policy provider,
executing a subroutine that virtualizes a hardware, and
executing a subroutine named in or provided in the rule.

8. The method according to claim 6, further comprising:
receiving a new rule,
creating a new rule infused machine code based on the program code and the new rule, and
replacing the rule infused machine code with the new rule infused machine code.

9. The method according to claim 6, further comprising:
receiving a policy file, and
creating the rule based on the received policy file.

10. The method according to claim 9, further comprises verifying that the policy provider is a trusted policy provider.

* * * * *